United States Patent [19]

Russ

[11] Patent Number: 4,604,005
[45] Date of Patent: Aug. 5, 1986

[54] PORTABLE SELECTOR DRILL

[76] Inventor: Norman Russ, Box 508, Norwich, Conn. 06360

[21] Appl. No.: 699,906

[22] Filed: Feb. 8, 1985

[51] Int. Cl.[4] ............................................. B23B 45/00
[52] U.S. Cl. ................................ 408/35; 408/241 R; 408/117
[58] Field of Search ............... 408/35, 31, 117, 239 R, 408/240, 241 R; 29/40

[56] References Cited

U.S. PATENT DOCUMENTS 2,303,565 12/1942 Luna .................................... 408/117
2,317,106 4/1943 Nummelin .............................. 173/46
2,679,770 6/1954 Carter et al. .......................... 408/35

FOREIGN PATENT DOCUMENTS 1073681 6/1967 United Kingdom .................. 408/35

Primary Examiner—Gil Weidenfeld
Assistant Examiner—Daniel W. Howell
Attorney, Agent, or Firm—McCormick, Paulding & Huber

[57] ABSTRACT

A portable drill with drill bit storage capability, and with mechanized bit feeding from bit storage to chuck.

4 Claims, 4 Drawing Figures

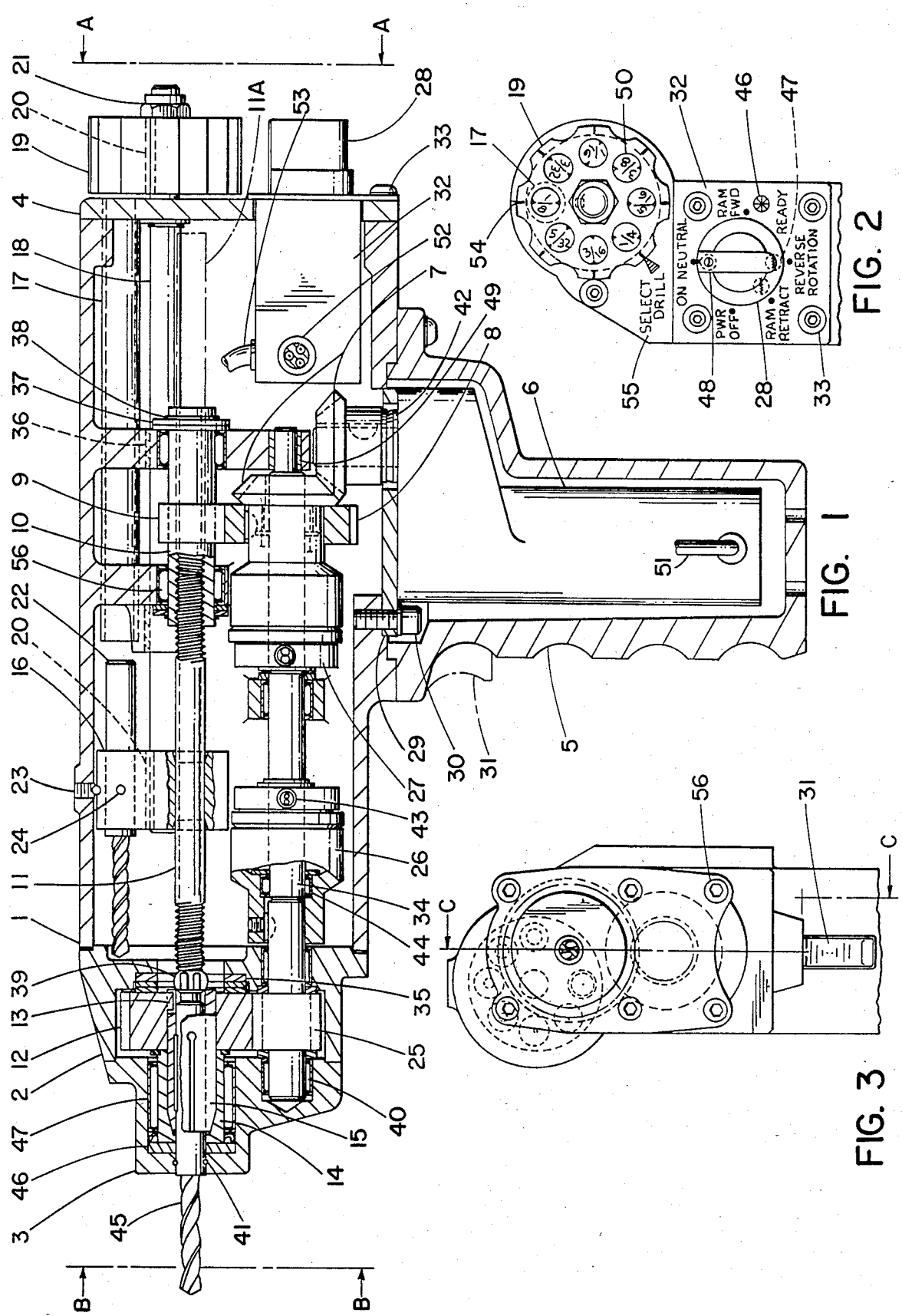

PORTABLE SELECTOR DRILL

This invention relates generally to portable electric drills, and deals more particularly with a portable electric drill unit which does not require manual manipulation of the chuck in order to remove or replace a drill bit.

The general object of the present invention is to provide an improved portable electric drill unit which has a housing containing a supply of commonly used drills, reamers or taps or a mix of all three as desired.

A more specific object is to provide a portable selector drill wherein any one of the predetermined selection of drill bits or the like can be fed into a collet chuck at the front end of the housing by manually selecting the proper size drill bit and by energizing an automated feeding system for advancing that particular drill bit into position for use.

BRIEF DESCRIPTION OF THE DRAWINGS

FIG. 1 is a cross section through the length of the drill housing assembly taken on the lines C, C of FIG. 3.

FIG. 2 is a rear view of the drill housing assembly being taken generally on the line A, A of FIG. 1.

FIG. 3 is a view of the front end of the drill housing assembly taken on the line B—B of FIG. 1.

DETAILED DESCRIPTION

Figure 4:
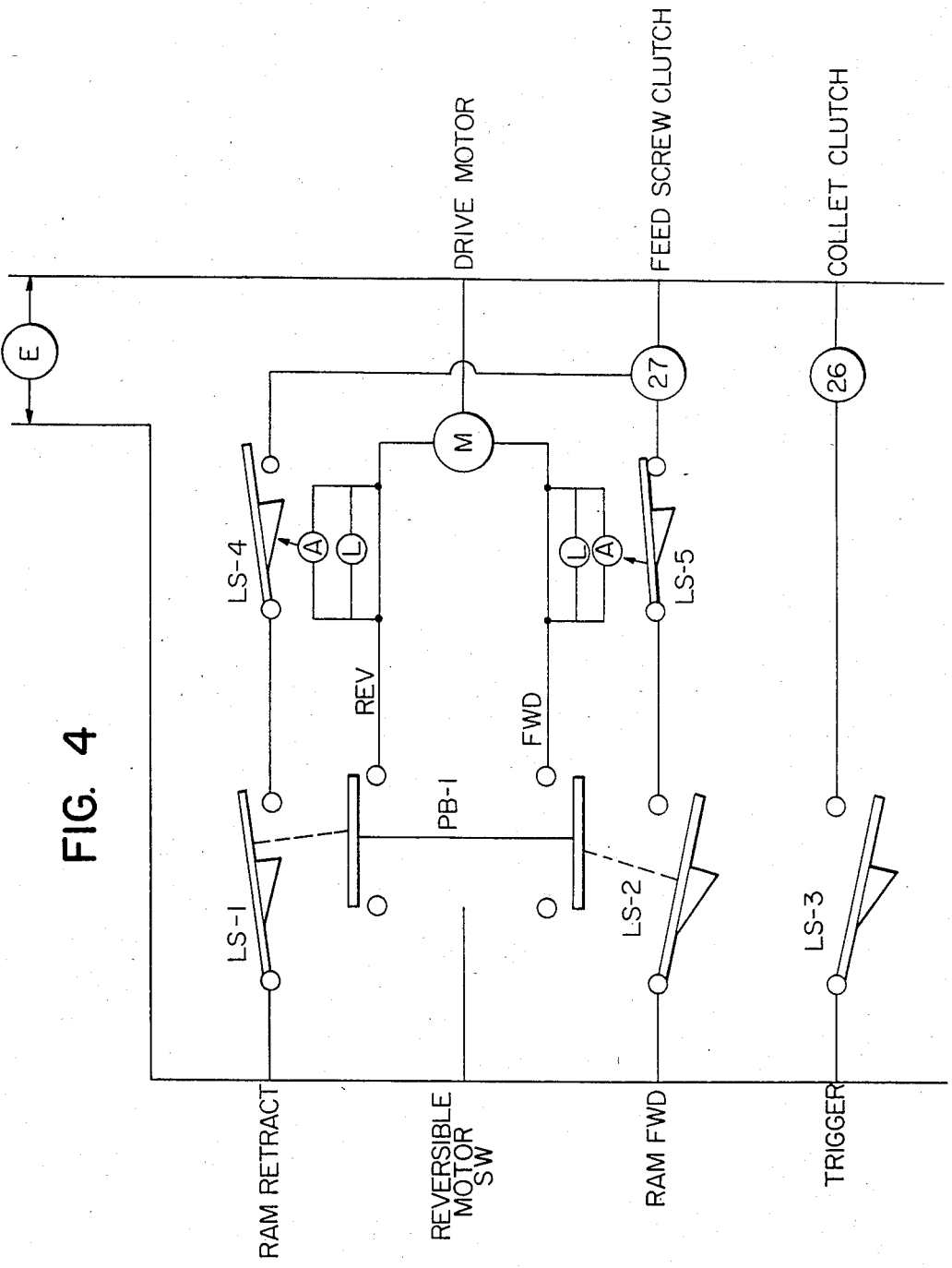
FIG. 4 is an electrical schematic diagram illustrating in schematic fashion the interrelationship between the various electromechanical components provided in the housing of FIGS. 1-3.

Turning to the drawings in greater detail, the portable selector drill comprises several sections appropriately fastened together and identified as follows with reference to the numerals on the several views. Main body section 1 is of generally cylindrical external contour and fastened to intermediate section 2 of generally frusto-conical configuration. Front section 3 defines an opening for the drill bit 45 and an O-ring seal is preferably provided as shown at 41 so that the roller bearing unit 47 can be permanently lubricated at assembly. The rear of the housing has a cover plate 4 attached to the generally cylindrical body section 1 by a conventional means, and the hollow handle 5 depends from this body section. A conventionally geared electric motor 6 is attached to plate 29 which is bolted to body section 1 by means of screws 30, 30. The gear motor 6 has its output shaft oriented generally vertically and a bevel gear 7 is provided thereon and is supported against thrust by needle thrust bearing 42. A second bevel gear 7 is mounted on shaft 34 and meshes with the output shaft bevel gear referred to previously. Shaft 34 passes through electric clutch 27 and terminates inside the hub of a second electric clutch 26. The shaft 34 is supported by needle roller bearing 44 at its forward end. The rear end of shaft 34 is supported by a bronze bushing 49. Gear 7 is keyed to shaft 34 so as to cause rotation thereof and of the electrical clutch components 26 and 27. At the forward end of shaft another shaft is provided with a gear 25 adapted to drive gear 12 associated with collet so as to achieve rotation of the drill bit itself. This shaft is also supported by needle bearings 40 at each end. The gear 12 is provided slidably on the outside diameter of chuck collet 15 and the collet is driven by tangs 13 which are part of the gear 12. These tangs engage open ended slots in the collet 15.

Surrounding collet 15 is a sleeve 14 with a tapered forward end on its inside diameter to receive the tapered forward end of the collet. Roller bearing 47 mentioned previously is pressed inside the front section 3 of the drill housing assembly. Also located in this section 3 is a heavy bronze washer 46 and O-ring mentioned previously. A thrust bearing 35 backs up gear 12.

The drill bit 45 is shown locked in collet 15 having been pushed into place by a feed screw 11. The feed screw 11 is activated by a threaded nut 10, which nut is supported by two needle roller bearings 56, 56 and held in linear captivity by thrust washers 37 and retaining rings 38. A flexible spider 39 is provided at the left or forward end of the feed screw 11 and will permit the feed screw to exert continous axial pressure on the inner end of drill bit 45 so as to assure that it remains secured in the collet 15 for rotation therewith.

A drill storage cartridge 16 is rotatably supported in the drill housing being fastened to shaft 18 by means of key 20. This shaft 18 is supported by bronze bushings 36 and extends through the rear cover plate 4 and also carries selector knob 19. A key 20 secures the knob 19 in accurately indexed relationship with respect to the openings in the cartridge 24. A flat washer and retaining ring are used to keep shaft 18 in place.

Feed tube 17 is provided for assembling the various drill bits or other tools in the cartridge 24 by means of a rod (not shown). The various drill bits are placed into the circumaxially arranged openings in the cartridge 24 which openings correspond in location and in identical relationship to the markings made on the exterior rear surface of the knob 19 as best shown in FIG. 2. The cartridge has detents 24 at each of the holes so as to releasably retain the various drill bits in position.

An electrical function box 32 is mounted by screws 33 and a selector switch knob 28 is provided for achieving the various electrical positions depicted schematically in FIG. 4. As shown in FIG. 1 a spur gear 8 is keyed to the hub of clutch 27 for achieving rotation of the captive nut 10 described previously. The feed screw 11 is shown in phantom lines to illustrates its retracted position and the trigger switch is indicated generally at 31 for achieving rotation of the drill bit by means of its associated collet. FIG. 2 illustrates the tool loading position 54 for the various drill bits by means of the drill selector position 55 interchangeable tool size disc 50 are also illustrated in FIG. 2. The selector switch 28 has a hole 48 which allows light to show through from several function indicator bulbs such as that shown at 47. A faceted lens 46 may be provided over a bulb to tell the operator that the rotation trigger switch has been activated.

Turning next to a brief description of the operation of the portable selector drill shown, it will be apparent that several bits or tools are first loaded into the apparatus by bringing knob 19 to position 54 and inserting the various bits by means of a push rod (not shown). Feed tube 17 assures that the bits are properly received in the various holes provided for this purpose in the rotatable cartridge. Regardless of the diameter of each of the individual bits the clamped end will always have a common diameter for more conveniently loading and chuck clamping of the bits in the single size collet shown. A size indicator disc maybe inserted into knob 19 to provide a record of a bit inserted in that particular opening.

The operator may then turn knob 28 to the select drill position 55 (power off). Turning on power to the forward position then activates feed screw 11 which thrusts the tool or bit into collet 15. The collet is slotted and therefor somewhat flexible in the manner of a conventional collet. The left end of feed screw 11 is equipped with spider like flexible web 39 so as to permit the feed screw to push against the tool bit and to anchor the collets tapered end into the matching taper of sleeve 14. This action forces the collet to grip the end of the tool firmly. During rotation the feed screw remains in contact with the end of the tool thus acting as a thrust member. After this preliminary motion the ready light will come on.

If the operator wishes to change the tool he merely turns the function knob 28 to ram retract position and when this action is completed a pilot out light will glow through the opening 48 in the knob 28. The operator then rotates knob 19 to the desired tool size at the selector drill position 55. The reverse rotation position is self-explanatory and is needed to extract tool bits or taps that may be stuck in a drill hole.

All electrical functions are interlocked for safety reasons as follows; when the feed screw is activated, clutch 27 only is energized. When the feed screw is translated its full travel, a load switch will sense a rise in amperage (see the A marking in FIG. 4) when the chuck is locked in resistance to the feed screw is felt. At this time, clutch 27 will be deenergized and disengaged. Ready light will then come on so that trigger 31 may now be depressed to energize clutch 26 setting gears 25 and 12 in motion to rotate the tool. An access plate (not shown) may be provided on one side of housing section 128 in maintenance of the drill. Removal of this plate can be made to open the switch cutting off power to the drill requiring a qualified technician to service the unit.

I claim:

1. An electrically energizable portable drilling device comprising:

a frame defining a handle portion and including a hollow housing body with a front and rear end, an electrically energizable motor in said frame and having an output shaft, a collet chuck rotatably supported in said frame at the front end of said housing body for rotation on a central axis, an elongated ram reciprocably mounted in said frame and oriented in axial alignment with said central axis of said rotatably mounted collet chuck for movement between rearward and forward positions, drive means provided between said motor output shaft and said collet chuck to rotate the latter in response to rotation of said motor output shaft, converting means provided between said drive means and said ram to cause linear movement of said ram in at least one axial direction in response to rotation of said motor output shaft, cartridge means rotatably mounted in said frame housing body such that one of several drill bit openings defined in said cartridge means can be aligned with said axial direction of movement of said ram and a drill bit in said one cartridge opening moved forwardly into said collet chuck by said linear ram movement said cartridge means provided between said front and rear ends of said housing body and said ram movable through said carriage opening to so position a bit in said collet chuck.

2. An electrically energizable portable drilling device according to claim 1 comprising control means to selectively reverse said motor and to selectively operate said ram in said one and an opposite direction.

3. An electrically energizable portable drilling device according to claim 2 wherein said drive means comprises decoupling means between said motor output shaft and said rotating collet chuck, and said control means including means for so operating said ram independently of rotation of said collet chuck.

4. An electrically energizable portable drilling device according to claim 1 comprising drive means and decoupling means between said motor output shaft and said converting means.

* * * * *